United States Patent [19]

Foreman

[11] 4,243,142

[45] Jan. 6, 1981

[54] TAPE STORAGE AND DISPLAY APPARATUS

[76] Inventor: Dave O. Foreman, 606 E. Broadway, Andrews, Tex. 79714

[21] Appl. No.: 42,454

[22] Filed: May 25, 1979

[51] Int. Cl.³ .................. A45C 11/28; A47F 5/12; E05B 73/00; B65D 85/67
[52] U.S. Cl. ................................ 206/387; 211/4; 312/218
[58] Field of Search .............. 206/387; 312/218; 211/4

[56] References Cited

U.S. PATENT DOCUMENTS

| | | | |
|---|---|---|---|
| 1,277,412 | 9/1918 | Hardart, Jr. | 312/218 |
| 3,495,716 | 2/1970 | Gregory | 211/4 |
| 3,760,952 | 9/1973 | White | 211/4 |
| 3,764,003 | 10/1973 | Loss | 206/387 |

Primary Examiner—William T. Dixson, Jr.
Attorney, Agent, or Firm—Marcus L. Bates

[57] ABSTRACT

A tape storage and display apparatus by which a plurality of tape decks are displayed to prospective purchasers, and at the same time theft of the individual tape deck is discouraged. The apparatus includes an open framework which forms a plurality of windows through which either side of the plurality of tape decks can be viewed. Each window is defined by the inner peripheral edge portion of a slot. Each slot slidably receives a plurality of tape decks therewithin. Each slot includes opposed pairs of flanges which slidably receive opposed marginal edge portions of the tape decks therewithin. The slots have one end which outwardly opens to permit the tape decks to be slidably removed therefrom. The outwardly opening end of the slot is closed by a lock means.

5 Claims, 5 Drawing Figures

U.S. Patent  Jan. 6, 1981  4,243,142
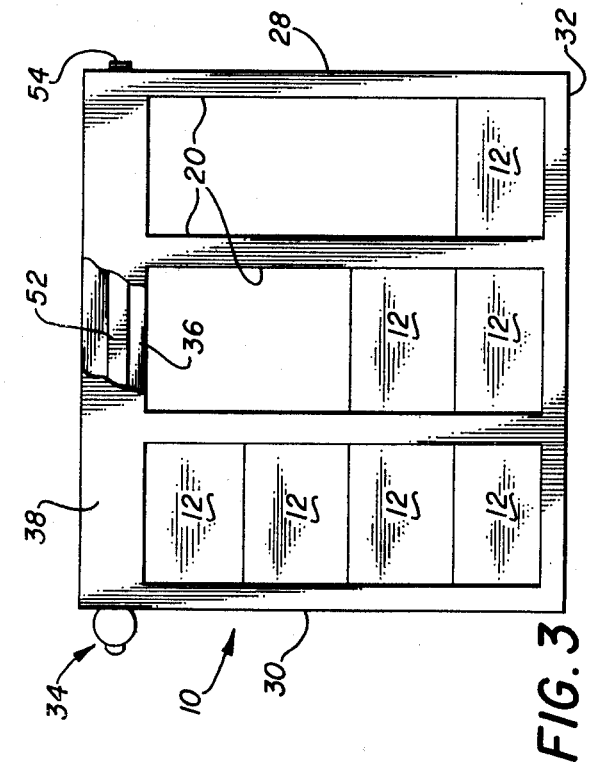
FIG. 3
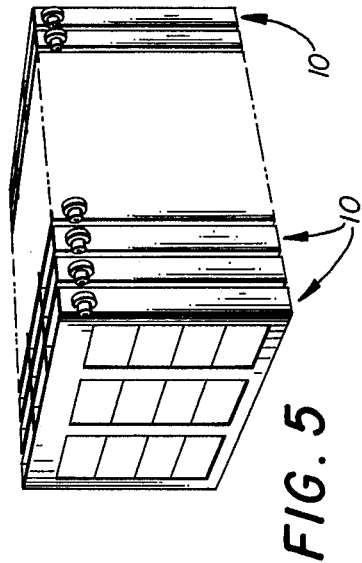
FIG. 5
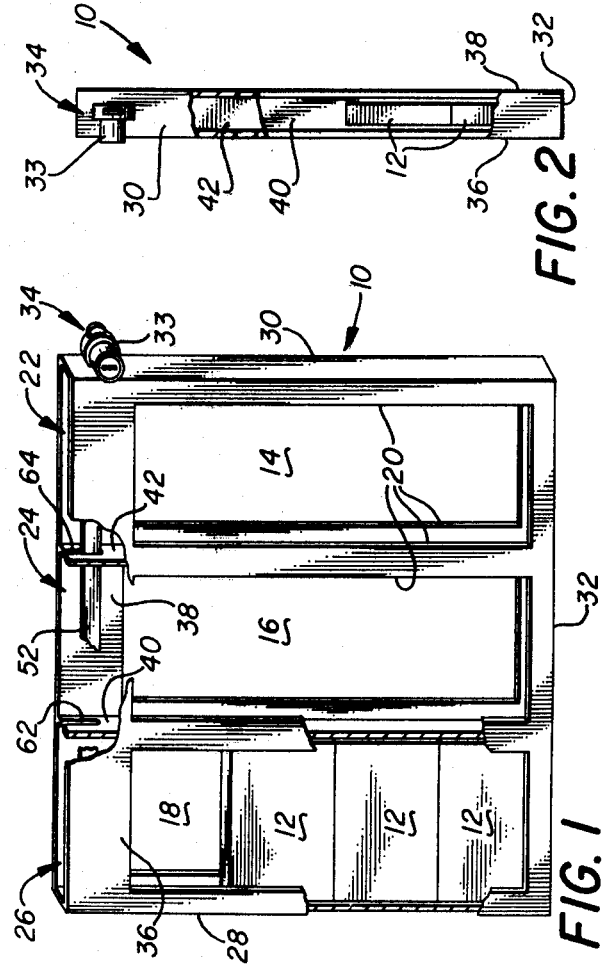
FIG. 2
FIG. 1
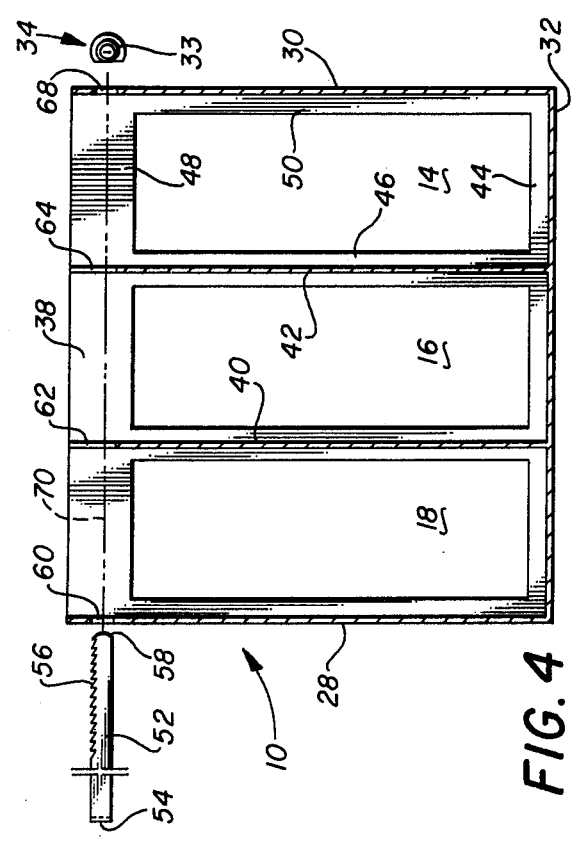
FIG. 4

TAPE STORAGE AND DISPLAY APPARATUS

BACKGROUND OF THE INVENTION

Tape decks, such as the compact cassettes and the larger eight track tape apparatus, provide an extremely convenient means by which knowledge can be stored. The modern tape deck is especially popular for providing recorded music, and many stores have found it profitable to offer a large stock of tape decks for sale to the public.

A large segment of the buying public is comprised of teenagers who like to browse through the tape decks for considerable lengths of time before making their selection of the particular tape they wish to purchase. A surprising number of these purchasers have discovered that the compact cassette tape deck is sufficiently small to enable it to be easily secreted in one's clothing, and accordingly, unlawful conversion of a large number of tape decks occur wherever tape decks are sold.

Many small stores, such as the modern neighborhood convenient stores, cannot employ more than one or two store personnel and accordingly, it is impossible to monitor all of the customers who may be present in the store at a given time. This lack of personnel encourages theft of the tape decks and for this reason many convenient stores refuse to stock tape decks because of the ratio of theft versus lawful sales.

It would therefore be desirable to provide a means by which tape decks can be displayed to the prospective purchaser, and at the same time discourage the individual tape deck from being stolen. It would be desirable that the tape decks be displayed in a manner which requires absolutely no supervision, which requires a minimum of storage space, and which enables the prospective purchaser to view a vast number of tapes without enlisting the aid of the store personnel. After the purchaser has made his tape selection, it would be desirable to provide a means by which the purchaser could pay the storekeeper and obtain the tape with a minimum expenditure of time. These desirable attributes are the subject of the present invention.

SUMMARY OF THE INVENTION

A tape storage and display apparatus comprising a main frame of polygonal configuration having a plurality of adjacently arranged tape receiving slots formed therewithin. Each of the slots have an inner peripheral edge which defines a window through which the tapes contained therewithin can be viewed.

Each tape receiving slot has opposed walls. A groove is formed within each of the opposed walls and receives opposed marginal end portions of each tape therewithin. Each slot includes opposed end portions, and a closure means is formed at each said end portion. One of the closure means is in the form of a lock means by which said closure means can be removed from the main frame so that a tape deck can be slidably removed from the slot.

A primary object of the present invention is the provision of a storage and display apparatus for holding a plurality of tape decks.

Another object of the present invention is the provision of a rectangular framework having a plurality of slots formed therewithin for slidably receiving a plurality of tape decks in a manner to enable either side of the tape deck to be viewed.

A further object of this invention is the provision of a tape deck storage and display apparatus having a plurality of tape receiving windows formed therewithin, and a lock means forming a closure means at one end of the window, through which the tape decks may be retrieved.

A still further object of the present invention is the provision of a framework having a plurality of tape decks removably captured therewithin such that the tape decks are displayed to a perspective purchaser.

These and various other objects and advantages of the invention will become readily apparent to those skilled in the art upon reading the following detailed description and claims and by referring to the accompanying drawings.

The above objects are attained in accordance with the present invention by the provision of a combination of elements which are frabricated in a manner substantially as described in the above abstract and summary.

BRIEF DESCRIPTION OF THE DRAWINGS

FIG. 1 is a perspective front view of a storage and display apparatus made in accordance with the present invention, with some parts being broken away therefrom, and some of the remaining parts being shown in cross-section;

FIG. 2 is a side view of the apparatus disclosed in FIG. 1, with some parts being broken away therefrom in order to disclose the interior thereof;

FIG. 3 is a rear view of the apparatus disclosed in the foregoing figures;

FIG. 4 is a cross-sectional, disassembled, plan view of the apparatus disclosed in the foregoing figures; and, FIG. 5 is a perspective view of a plurality of the apparatus disclosed in the foregoing figures.

DETAILED DESCRIPTION OF THE PREFERRED EMBODIMENT

In the figures of the drawings, there is disclosed a storage and display apparatus 10 for holding a plurality of tape decks 12 therewithin. The apparatus is in the form of a polygon and includes a plurality of windows in the form of parallel slots 14, 16, and 18 arranged adjacent to one another for slidably receiving a plurality of tapes therewithin.

As seen in the figures of the drawings, each of the slots have an inside peripheral edge portion 20 which form windows through the apparatus. The slots outwardly open at 22, 24, and 26, respectively, to enable the tape decks from either slot, 14, 16, and 18, respectively, to be slidably removed and replaced therewithin.

The frame includes opposed sides 28 and 30; a bottom 32; and a removable closure means 34 in the form of a locking device for preventing removal of any tape deck from either of the slots.

The frame is a monocoque structure having a front panel 36 spaced from a rear panel 38, with intermediate divider walls 40 and 42 connected therebetween. Hence, the sidewalls 28 and 30 together with the intermediate divider walls and lower wall 32 are integrally attached to the front and rear panels to present the aforesaid monocoque structure.

The front and rear panels cooperate with the divider walls to provide the illustrated spaced apart flanges 44, 46, 48, and 50. The before mentioned locking device includes an elongated member 52 having a stop means 54 at one end thereof and a sawtooth or serrated marginal end receives the lock 33 so that the stop means 54 abuttingly engages wall 28 when the elongated member is telescopingly extended through aperture 60, cut-outs 62 and 64, and aperture 68, such that the member 52 lies along the dot-dash line 70, as seen in FIG. 4, for example.

In operation, a key is fitted within the lock 33 of the lock means 34, and the lock is removed from the serrated portion 56 of the end 58. Member 52 is next withdrawn from the illustrated position 70, thereby removing the closure member from the open ends 22, 24, and 26 of the slots. This enables all of the tape decks of any slot 14, 16, and 18 to be slidably removed through the open end.

Accordingly, a plurality of tape decks 12 can be placed within each of the plurality of slots 14, 16, and 18, and a multiplicity of the frames 10 can be stacked as seen in FIG. 5, so that hundreds of tape decks are displayed in a display rack. The shopper can sequentially remove each of the frames 10 of FIG. 5, look at either side of the frame so as to study the titles printed on either side of the tape decks, and when the shopper decides upon his purchase, he can carry the frame containing his selection to the store clerk. The store clerk removes the lock device 33 from the closure means 34, removes the selected tape deck, repositions the lock means, and after payment for the tape deck has been received, the frame is refilled and returned to the display rack.

The physical size of the display apparatus precludes secreting the apparatus on one's person and thereby obviates theft of the individual tape decks. The display apparatus reduces handling damage to the tape decks, and eases inventory problems by enabling a rapid and exact count of tapes to be achieved.

The display apparatus preferably is made by injection molding, although it can also be fabricated from component parts affixed to one another to provide a unitary main frame member. The lock for the removable closure means is commercially available, and one key can be made which fits all of the locks of the several main frames which constitute the stack of FIG. 5.

I claim:

1. A storage and display apparatus for holding a plurality of tape decks, comprising:
   a main frame having a front panel spaced from a rear panel by opposed sidewalls and parallel divider walls connected therebetween which cooperate together to form a plurality of tape receiving slots within said main frame, said plurality of slots being arranged adjacent to one another;
   each said slot having an outwardly directed opening which is closed by a single removable closure means, an end wall opposed to said opening in the slot, said opposed sidewalls extending from said slot opening to said end wall; the main frame has an inner peripheral edge portion which defines a window, said window extends into said slot;
   a flange formed by the marginal peripheral edge portion of said window for slidably receiving the opposed marginal edges of a tape deck therewithin;
   so that the removable closure means can be removed from the opening of each said slot, a plurality of tape decks can be placed within each said slot, the removable closure means placed to close the opening, whereupon the tape decks are captured within the main body and may be viewed through the window.

2. The storage and display apparatus of claim 1 wherein said windows are cut-outs formed in said front and rear panels to present an edge portion formed inwardly of said parallel divider walls to leave a marginal edge of the front and rear panels extending towards one another;
   said marginal edge of said front and rear panels together with the adjacent divider walls form said flange within which the opposed marginal edges of a tape deck can be received.

3. The storage and display apparatus of claim 2 wherein apertures are formed through a marginal end of said side walls in aligned relationship respective to one another; said removable closure means being an elongated member received through said apertures, and lock means by which said elongated member is affixed within said apertures.

4. The storage and display apparatus of claim 1 wherein said front and rear panels are connected together in spaced parallel relationship by said divider walls which are placed normal to said front and rear panels, adjacent pair of said divider walls together with said front and rear panels form one of said slots;
   means forming apertures through a marginal end of said divider walls in aligned relationship respective to one another; said removable closure means being an elongated member received through said apertures, and lock means by which said elongated member is affixed within said apertures.

5. The apparatus of claim 1 wherein each slot is defined by spaced parallel divider walls which are attached to said front and rear panels; said windows are cut-outs formed in said front and rear panels to present an edge portion formed inwardly of said parallel dividers to leave a marginal edge of the front and rear panels extending towards one another;
   said marginal edge of said front and rear panels together with adjacent divider walls form said groove within which the opposed marginal edges of a tape deck can be received;
   wherein apertures are formed through a marginal end of said sidewalls in aligned relationship respective to one another; said removable closure means being an elongated member received through said apertures, and lock means by which said elongated member is affixed within said apertures;
   said elongated member being arranged to close the opening of each slot so that a tape deck is captured within said slot;
   one end of said elongated member having a stop means formed thereon to prevent the stop end of the member from being moved axially through the apertures, and a removable lock means attached to the other end of the elongated member to prevent said other end of the elongated member from moving in the opposite direction through the apertures.

* * * * *

UNITED STATES PATENT AND TRADEMARK OFFICE
CERTIFICATE OF CORRECTION

PATENT NO. : 4,243,142

DATED : January 6, 1981

INVENTOR(S) : Dave O. Foreman

It is certified that error appears in the above-identified patent and that said Letters Patent is hereby corrected as shown below:

Claim 5, line 44, "groove" should read -- flange --

Signed and Sealed this

Ninth Day of April 1985

[SEAL]

Attest:

DONALD J. QUIGG

Attesting Officer    Acting Commissioner of Patents and Trademarks